United States Patent [19]

Yoshino

[11] Patent Number: 5,036,946
[45] Date of Patent: Aug. 6, 1991

[54] SPEAKER SYSTEM
[75] Inventor: Akira Yoshino, Daito, Japan
[73] Assignee: Sanyo Electric Co., Ltd., Osaka, Japan
[21] Appl. No.: 499,738
[22] Filed: Mar. 27, 1990
[30] Foreign Application Priority Data Mar. 29, 1989 [JP] Japan .................................. 1-80140

[51] Int. Cl.⁵ ............................................. H05K 5/00
[52] U.S. Cl. ..................................... 181/156; 312/7.2
[58] Field of Search .............. 181/148, 150, 152, 153, 181/156, 149, 199, 145; 312/7.1, 7.2

[56] References Cited

U.S. PATENT DOCUMENTS

| | | | |
|---|---|---|---|
| 2,232,399 | 2/1941 | Manson | 312/7.2 X |
| 2,627,931 | 2/1953 | Flewelling | 312/7.1 X |
| 2,808,121 | 10/1957 | Goettner | 181/145 |
| 3,113,633 | 12/1963 | Eberhardt et al. | 181/145 |
| 3,186,509 | 6/1965 | Dudognon | 181/155 |

FOREIGN PATENT DOCUMENTS 58-50781  4/1983  Japan .

Primary Examiner—Brian W. Brown
Attorney, Agent, or Firm—Armstrong, Nikaido, Marmelstein, Kubovcik & Murray

[57] ABSTRACT

A speaker system installable in a narrow space and capable of efficiently reproducing sounds of frequencies of up to about 45 Hz. The system comprises a speaker, and a speaker cabinet having a first chamber enclosing the rear side of the speaker and a second chamber enclosing the front side of the speaker. The first chamber is provided with at least one duct communicating at its forward end with a port portion in the cabinet. The second chamber has an aperture or apertures which are 0.02 to 0.25 in opening degree, i.e., in the ratio of the combined opening area of the aperture to the inside volume of the second chamber.

6 Claims, 4 Drawing Sheets

SPEAKER SYSTEM

FIELD OF INDUSTRIAL APPLICATION

The present invention relates to improvements in speaker systems for low sounds, and more particularly to a compact speaker system suited for use in television receivers.

BACKGROUND OF THE INVENTION

To provide sounds of higher quality with television receivers, attempts have been made in recent years to simulate the perception at a live performance by placing emphasis on the reproduction of low sounds which has not been considered very important.

Unexamined Japanese Utility Model Publication SHO 58-50781 discloses a speaker system for low sounds for use in television receivers. With reference to FIG. 5 showing the disclosed system, a speaker cabinet 3 provided at the lower portion of a TV cabinet 1 houses speakers 12 for medium to high sounds, drive speakers 14 for low sounds and horns 16.

However, this speaker system has the problem of necessitating a large speaker cabinet to increase the overall volume of the television receiver since the horns need to have an increased volume for the reproduction of low sounds, i.e., sounds of low frequencies.

On the other hand, speaker systems of the so-called Kelton type are known as speaker systems having a small speaker cabinet and nevertheless adapted for the reproduction of low sounds.

FIG. 4 is a diagram showing the principle of the speaker system. The speaker cabinet 3 comprises a first chamber 22 surrounding the rear side of a speaker 5 and formed with a duct 20, and a second chamber 24 surrounding the front side of the speaker 5.

The first chamber 22 is formed based on the principle of Helmholtz resonator. The sound waves radiated from the rear side of the speaker 5 resonate at a specific frequency (termed the "cabinet resonance frequency") according to the correlation between the inside volume of the first chamber 22 and the mass of the air in the duct portion 20, and are released from the cabinet 3.

The cabinet resonance frequency is expressed by the following equation.

$$fr = \frac{C}{2\pi} \sqrt{\frac{S}{LV}}$$

wherein
fr: cabinet resonance frequency (Hz)
C: speed of sound (m/s)
S: cross sectional area of the duct (m$^2$)
L: length of the duct (m)
V: volume of the first chamber (m$^3$)

The cabinet resonance frequency fr needs to be lower in order to extend the range of reproduction of low frequencies for the reproduction of low sounds. The cabinet resonance frequency fr can be decreased by increasing the volume V of the first chamber, but this results in the problem of making the speaker cabinet larger. Accordingly, the frequency fr is decreased for the reproduction of low sounds by decreasing the volume V of the first chamber and suitably increasing the length of the duct 20.

The second chamber 24 confines the sound waves radiated from the front side of the speaker 5, inhibiting the vibration of the cone type diaphragm of the speaker S owing to the acoustic stiffness of air.

The second chamber 24 is provided for the following reason. According to the principle of Helmholtz resonator, the resonance frequency at the duct portion 20 of the first chamber 22, i.e., the cabinet resonance frequency, is a frequency when the amplitude of the speaker diaphragm becomes very small. However, although the amplitude of the diaphragm is small at the cabinet resonance frequency, the amplitude increases at frequencies different from the cabinet resonance frequency. The amplitude then gives undesired vibration to the diaphragm to flutter the diaphragm and break the diaphragm.

The degree to which the vibration of the diaphragm is inhibited is dependent on the volume of the second chamber. If the volume is small, the acoustic stiffness of air is great, consequently inhibiting the vibration of the diaphragm greatly and rendering the diaphragm less likely to vibrate. Nevertheless, this means an increase in the lowest resonance frequency of the speaker to restrict the reproduction range of low sounds. In order to reproduce sounds of low frequencies, for example, of up to about 45 Hz, it is therefore necessary to increase the weight of the diaphragm of the drive coil, consequently leading to the problem of a reduced acoustic conversion efficiency.

If the volume of the second chamber is great, on the other hand, the vibration of the diaphragm will not be inhibited effectively since the stiffness of air is then small. Accordingly, if the second chamber has too great a volume, the provision of the second chamber becomes meaningless, and the diaphragm will flutter and become broken. Thus, there is a limitation to the increase in the volume of the second chamber.

Because of the problems described above, the Kelton-type speaker has found no use in television receivers. For use in television receivers, therefore, it has been desired to provide a compact speaker system which is adapted to efficiently reproduce sounds of low frequencies of up to about 45 Hz.

We have developed a speaker system which is compact and yet capable of efficiently reproducing sounds of low frequencies of up to about 45 Hz based on the finding that the same effect as an increase in the volume of the second chamber can be achieved when the second chamber is formed with apertures with an opening degree in a predetermined range.

SUMMARY OF THE INVENTION

An object of the present invention is to provide a speaker system which can be installed in a narrow space and is adapted to efficiently reproduce low sounds.

Another object of the present invention is to provide a speaker system which can be installed in a narrow space and which is capable of efficiently reproducing sounds of frequencies of up to about 45 Hz.

Still another object of the present invention is to provide a speaker system which can be incorporated into a television receiver without rendering the receiver large-sized and which is adapted to reproduce low sounds efficiently.

The present invention provides a speaker system which comprises a speaker having a diaphragm, and a speaker cabinet having a first chamber enclosing the rear side of the speaker diaphragm and a second chamber enclosing the front side of the speaker diaphragm, the first chamber being provided with at least one duct, the duct communicating at its forward end with a port portion formed in the cabinet. The second chamber having an aperture or apertures with an opening degree of 0.02 to 0.25. The opening degree represents the ratio of the combined opening area of the aperture the opening area of the total apertures) t the inside volume of the second chamber and is expressed by the following equation.

$$\text{Opening degree (cm}^2/\text{cm}^3) = \frac{\text{Combined opening area (cm}^2)}{\text{Inside volume (cm}^3)}$$

DESCRIPTION OF THE PREFERRED EMBODIMENTS

The present invention will be described below in detail with reference to the illustrated embodiments.

Figure 2:
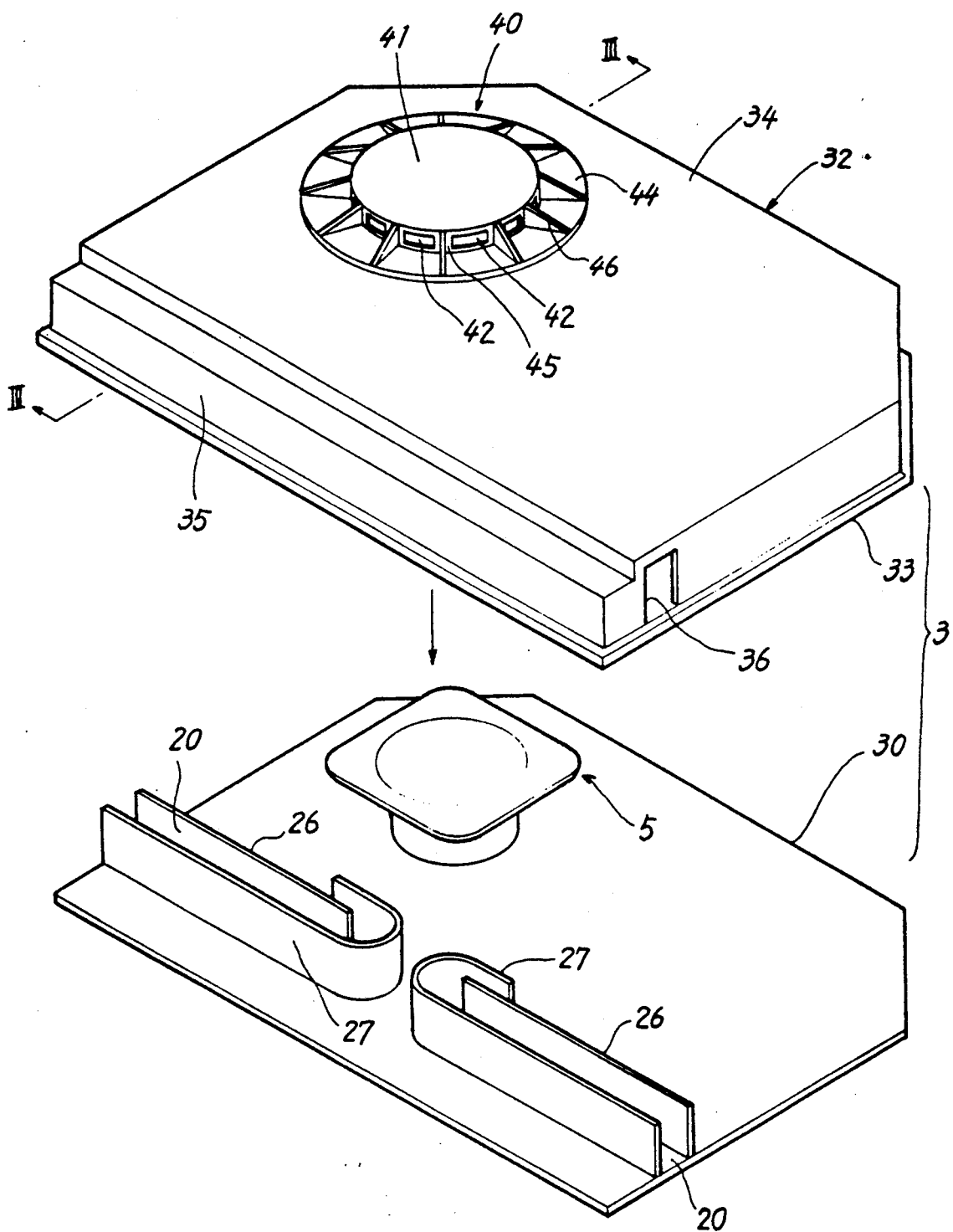
FIG. 2 is an exploded perspective view of the speaker system of the invention.
Figure 3:
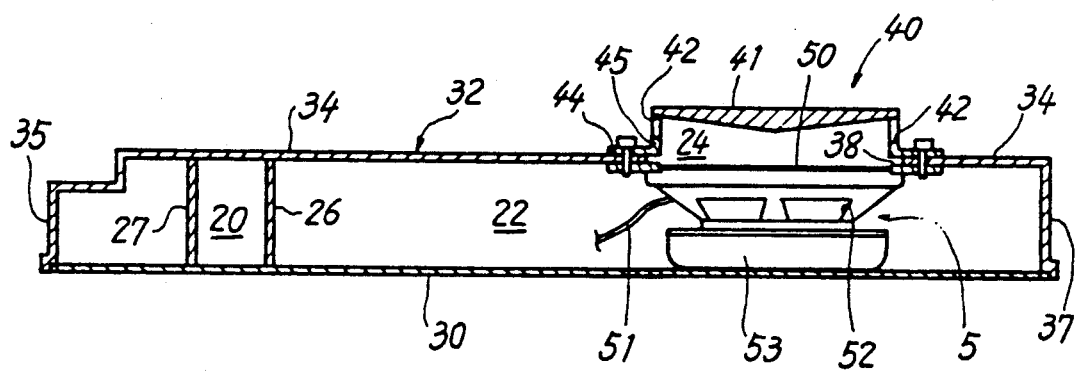
FIG. 3 is a view in section taken along the line III—III in FIG. 2 when the speaker system is in the assembled state.

Referring to FIGS. 2 and 3, a speaker cabinet 3 is in the form of a box comprising a lower member 30 and an upper member 32. The upper member 32 has side walls 33, 33, a front wall 35 and a rear wall 37 which extend downward from the periphery of a top plate 34 and are fitted to the lower member 30 for the upper member 32 to cover the lower member 30.

The top plate 34 of the upper member 32 is formed with a hole 38 positioned as opposed to the diaphragm 50 of a drive speaker 5. Each of the side walls 33, 33 is formed with a port 36 for releasing therethrough the sound waves radiated from the rear side of the speaker diaphragm 50. The port portions 36, 36 may be formed in the front wall 35.

A cover member 40 is provided over the hole 38 in the top plate 34. The cover member 40 comprises a hollow cylindrical peripheral wall 45, an upper plate 41 at the upper end of the wall 45, and a flange 44 at the lower end of the wall 45. The peripheral wall 45 is formed with a plurality of slit apertures 42 arranged at a predetermined spacing. According to the present embodiment, twelve apertures 42 are formed as equidistantly spaced apart, whereas the number of aperture is not limitative. With the present invention, the combined opening area of the aperture is more important than the number of apertures as will be described later. The cover member 40 is secured to the top plate 34 of the upper member 32 by the flange 44.

The lower member 30 is provided with ducts 20 each of which comprises a straight side plate 26, and a side plate 27 having a U-shaped bent end. The two side plates 26, 27 are opposed to each other as spaced apart by a suitable distance. The ducts 20, which are provided in a pair, communicate at their outer ends with the respective port portions 36, 36 in the side walls 33 of the upper member 32. The ducts 20 need not always be provided in a pair.

Through a cord 51, an electric signal is fed to a voice coil disposed in a space of a magnetic circuit 53 of the speaker 5 to vibrate the diaphragm 50 which is secured to the voice coil, whereby sound waves are radiated from the front and rear sides of the diaphragm. The sound waves radiated from the rear side of the diaphragm 50 are released through sound holes 52. According to the present embodiment, the speaker 5 is disposed at the left side of the system toward the rear wall thereof and is attached at its bottom portion to the lower member 30 and at its top portion to the top plate 34 of the upper member 32 by suitable fastening means.

The upper member 32 with the cover member 40 attached thereto is fitted over and fixed to the lower member 30. Consequently formed inside the speaker cabinet 3 are a first chamber 22 enclosing the rear side of the diaphragm 50 of the speaker 5 and a second chamber 24 enclosing the front side of the diaphragm 50.

Figure 1:
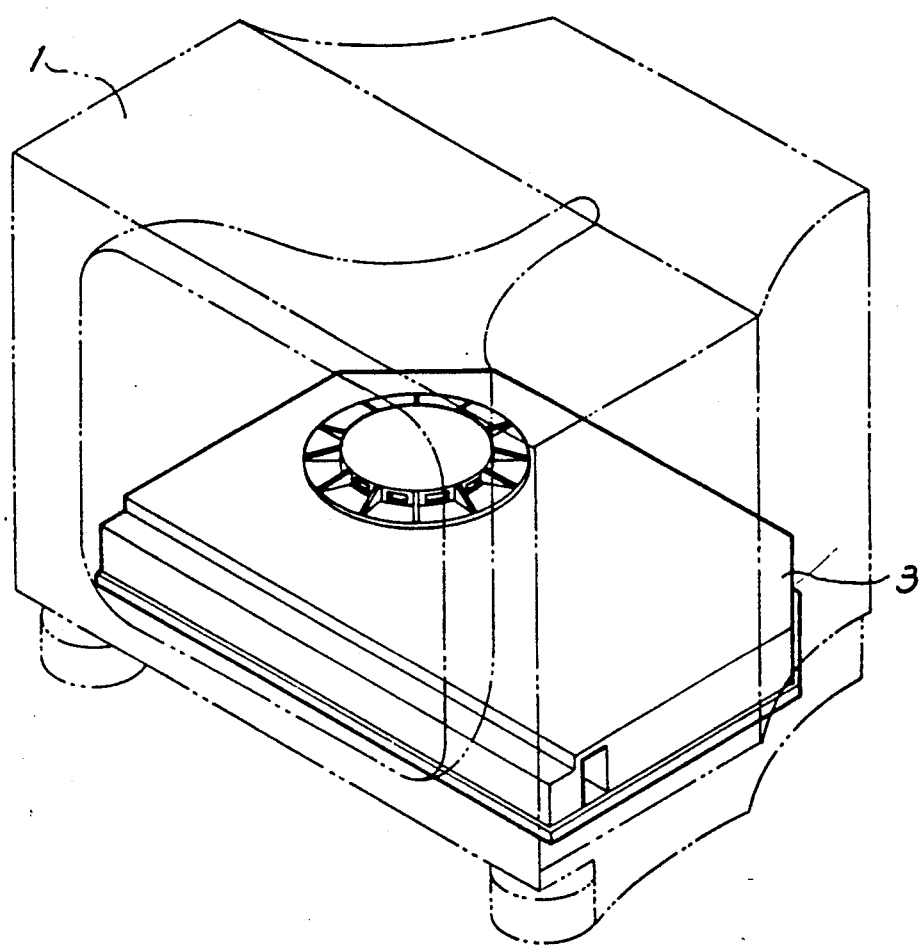
FIG. 1 is a perspective view showing a speaker system of the present invention as incorporated in a television receiver.

As seen in FIG. 1, the speaker cabinet 3 is accommodated in the lower portion of a television cabinet 1. Thus, the television receiver having the speaker system incorporated therein can be in a compact form in its entirety.

The cover upper plate 41 has a lower surface slightly bulging at the central portion, while the peripheral wall 45 has ribs 46 radially projecting therefrom between the slit apertures 42, whereby the sound waves radiated from the front side of the speaker diaphragm 50 can be released as guided by this configuration.

Figure 3A:
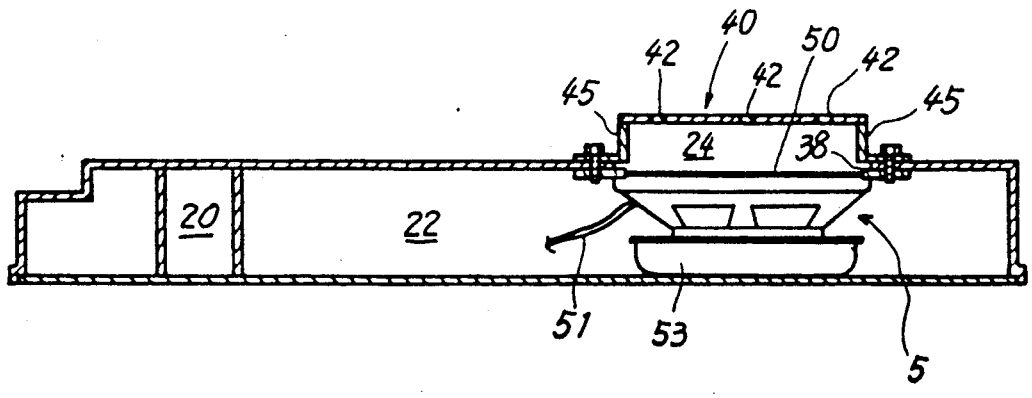
FIG. 3A is a sectional view similar to FIG. 3 and showing another embodiment of cover member.
Figure 4:
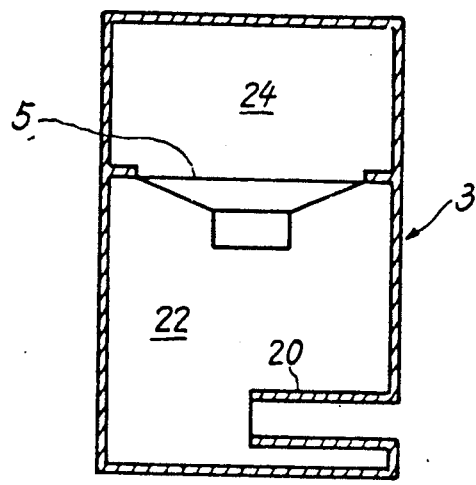
FIG. 4 is a sectional view schematically showing a conventional speaker system of the Kelton type.
Figure 5:
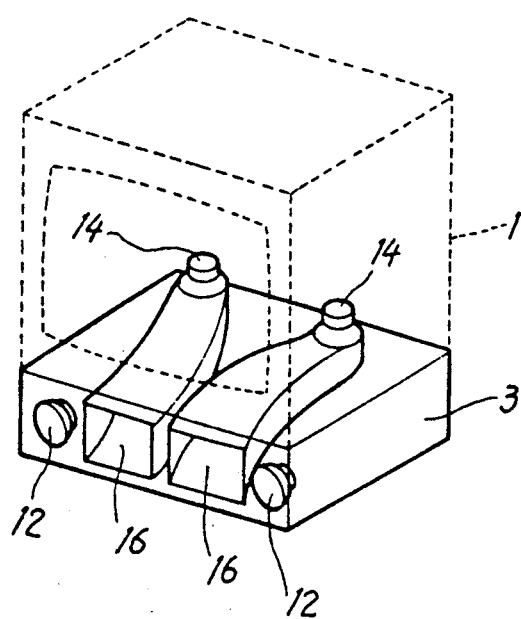
FIG. 5 is a perspective view of a conventional speaker system as incorporated in a television receiver.

The apertures 42 need not always be formed in the peripheral wall 45 but can be formed directly in the upper plate 41 as shown in FIG. 3A.

Next, an example is given below to clarify to what value the combined or total opening area of the apertures 42 is to be set.

EXAMPLE

A specified electric signal was fed to the drive speaker with the apertures 42 given varying combined opening areas to check the reproduced sound for frequency. Table 1 shows the results.

The second chamber was 56.7 cm$^3$ in inside volume. The term the "opening degree" as used herein refers to the combined opening area of the apertures 42 to the inside volume.

TABLE 1

| Combined opening area of apertures 42 (cm$^2$) | Opening degree (cm$^2$/ cm$^3$) | Reproduction frequency (Hz) |
|---|---|---|
| 8.28 | 0.145 | 40–150 |
| 6.21 | 0.110 | 42–150 |
| 4.14 | 0.073 | 42–145 |
| 2.07 | 0.037 | 45–140 |
| 1.38 | 2.4 | 45–140 |
| 0.69 | 1.2 | 48–125 |
| 0 | 0 | 62–80 |

As will be apparent from Table 1, the range of frequencies reproducible becomes wider and the frequency reproducible becomes lower as the combined opening area of the apertures 42 increases. As already stated, however, the diaphragm then tends to flutter and is liable to break. Accordingly, opening degrees greater than 0.25 are not useful practically, and the upper limit of the opening degree should be 0.25.

Further since the present invention contemplates reproduction of frequencies of up to about 45 Hz, the results of Table 1 appear to indicate that the lower limit of the opening degree is about 0.02.

However, when the range of frequencies and the lowest frequency to be reproduced, adverse effects on the diaphragm, etc. are considered collectively, it is desirable that the opening degree be in the range of 0.07 to 0.20, more preferably 0.10 to 0.17.

Thus, the second chamber 24 is made to have an opening area in a suitable range, with the result that the system efficiently reproduces low sounds with the undesirable vibration of the diaphragm fully inhibited.

Stated more specifically, when the speaker 5 is driven, the diaphragm radiates sound waves from the rear side thereof toward the first chamber 22. These sound waves resonate inside the ducts 20 at the cabinet resonance frequency of the first chamber 22 and are released from the ports 36 to the outside. The cabinet resonance frequency at this time is close to the lowest resonance frequency of the speaker as operated singly. This ensures reproduction of low sounds.

The diaphragm also radiates sound waves from the front side thereof toward the second chamber 24. These sound waves are released suitably through the apertures 42 having the specified overall opening area. Although the second chamber 24 has a small inside volume, the stiffness of air is reduced to the desired level by these apertures.

The speaker system of the present invention is adapted to reproduce low sounds efficiently, can nevertheless be accommodated in a small space and is therefore suited especially for use in television receivers.

The system of the present invention can be altered or modified in various ways by one skilled in the art within the scope of technical concept disclosed in the appended claims. It is to be understood that such alterations or modifications are included within the scope of the present invention.

What is claimed is:

1. A speaker system comprising:

a speaker having a diaphragm that has a front side and a rear side; and a speaker cabinet operatively connected to said speaker having defined therein a first chamber enclosing the rear side of the diaphragm, a second chamber enclosing the front side of the diaphragm and at least one port portion formed on said speaker cabinet, the first chamber having formed therein at least one duct communicating with said port portion, and the second chamber having defined therein at least one aperture with an opening degree that represents a ratio of the combined opening area of the aperture to the inside volume of the second chamber as defined by the equation $$\text{Opening degree } (cm^2/cm^3) = \frac{\text{Combined opening area } (cm^2)}{\text{Inside volume } (cm^3)}$$

wherein the opening degree of the aperture is between 0.02 to 0.25.

2. A speaker system as defined in claim 1 wherein the opening degree of the aperture of the second chamber is 0.07 to 0.20 $(cm^2/cm^3)$.

3. A speaker system as defined in claim 1 wherein the opening degree of the aperture of the second chamber is 0.10 to 0.17 $(cm^2/cm^3)$.

4. A speaker system as defined in claim 1, wherein the speaker cabinet includes a top plate, and
   the second chamber being defined by a cover member attached to the top plate opposite the diaphragm of said speaker,
   the cover member having a short hollow cylindrical peripheral wall that has the aperture of the second chamber defined thereon.

5. A speaker system as defined in claim 1, wherein the speaker cabinet includes a top plate, and
   the second chamber being defined by a cover member attached to the top plate opposite the diaphragm of said speaker,
   the cover member having an upper plate that has the aperture of the second chamber defined therein.

6. A speaker system as defined in claim 1, wherein said speaker cabinet operatively connects within a lower portion of a cabinet of a television receiver.

* * * * *